US006590177B2

(12) United States Patent
Takahashi et al.

(10) Patent No.: US 6,590,177 B2
(45) Date of Patent: Jul. 8, 2003

(54) MEMBRANE SWITCH AND PRESSURE SENSITIVE SENSOR

(75) Inventors: Katsuhiko Takahashi, Sakura (JP); Takayuki Imai, Sakura (JP); Toshio Ochiai, Tokyo (JP); Toshifumi Nakajima, Tokyo (JP); Koji Ito, Ama-gun (JP); Kazuya Tanaka, Nagoya (JP)

(73) Assignees: Fujikura Ltd., Tokyo (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/159,119

(22) Filed: Jun. 3, 2002

(65) Prior Publication Data

US 2003/0000821 A1 Jan. 2, 2003

(30) Foreign Application Priority Data

Jun. 1, 2001 (JP) ....................................... 2001-167113

(51) Int. Cl.[7] ........................ H01H 13/702; H01H 1/08; G01L 1/20; H01C 10/10

(52) U.S. Cl. ........................ 200/512; 200/268; 339/114

(58) Field of Search ................................ 200/5 A, 5 R, 200/86 R, 512–517, 262–270; 338/99, 114

(56) References Cited

U.S. PATENT DOCUMENTS

| | | | | | |
|---|---|---|---|---|---|
| 3,860,771 | A | * | 1/1975 | Lynn et al. | 200/5 A |
| 4,066,851 | A | * | 1/1978 | White et al. | 200/5 A |
| 4,414,452 | A | * | 11/1983 | Denley | 200/512 |
| 4,607,147 | A | * | 8/1986 | Ono et al. | 200/512 |
| 5,810,604 | A | * | 9/1998 | Kopp et al. | 200/512 X |
| 6,054,664 | A | * | 4/2000 | Ariga et al. | 200/512 |
| 6,072,130 | A | * | 6/2000 | Burgess | 200/86 R |
| 6,144,003 | A | * | 11/2000 | Kamishima | 200/515 |
| 6,388,556 | B1 | * | 5/2002 | Imai et al. | 338/114 |
| 6,392,178 | B1 | * | 5/2002 | Kuratani | 200/512 |

* cited by examiner

*Primary Examiner*—J. R. Scott

(74) *Attorney, Agent, or Firm*—Oblon, Spivak, McClelland, Maier & Neustadt, P.C.

(57) ABSTRACT

A pressure sensitive sensor is composed of a pair of upper and lower electrodes sheets 1 and 2 disposed oppositely, a spacer 3 interposed between both of the sheets 1 and 2, and adhesives 4 and 5 between these electrode sheets 1 and 2 and spacer 3. In the spacer 3, a hole 31 is formed in a position of a contact portion 6. A diameter of this hole 31, convex portions 13 and a pressure sensitive electrode 22 are set in such a positional relationship that a peripheral portion of the hole 31 is overlapped between the convex portions 13 and the pressure sensitive electrode 22. Then, the adhesives 4 and 5 open more largely than the diameter of the hole 31 of the spacer 3 so as to be removed from the peripheral portion of the hole 31 on both surfaces of the spacer 3.

7 Claims, 5 Drawing Sheets

FIG.5

| | | EXAMPLE 1 | COMPARATIVE EXAMPLE 1 |
|---|---|---|---|
| SENSITIVITY VARIATION OF 20 POINTS OF CONTACT (UNDER NORMAL TEMPERATURE) | | ±15% | ±30% |
| TEMPERATURE PROPERTY (ON LOAD VARIATION RATE DUE TO TEMPERATURE WITH RESPECT TO NORMAL TEMPERATURE CASE) | −30℃ | +15% | +90% |
| | +80℃ | −20% | −50% |

FIG.6

| | | EXAMPLE 2 | COMPARATIVE EXAMPLE 2 |
|---|---|---|---|
| SENSITIVITY VARIATION OF 20 POINTS OF CONTACT (UNDER NORMAL TEMPERATURE) | | ±15% | ±30% |
| TEMPERATURE PROPERTY (ON LOAD VARIATION RATE DUE TO TEMPERATURE WITH RESPECT TO NORMAL TEMPERATURE CASE) | −30℃ | +5% | +80% |
| | +80℃ | −5% | −35% |

MEMBRANE SWITCH AND PRESSURE SENSITIVE SENSOR

BACKGROUND OF THE INVENTION

1. Field of the Invention

This invention relates to a membrane switch and a pressure sensitive sensor, which are composed by bonding a pair of electrode sheets and a spacer interposed therebetween with an adhesive interposed therebetween.

2. Description of the Related Art

The membrane switch is a laminated structure composed of a pair of electrode sheets having electrodes formed respectively on opposite surfaces of a pair of sheetlike base materials disposed oppositely, the electrodes constituting a contact portion, and of a sheetlike spacer interposed therebetween. In order to allow the upper and lower electrodes to come into contact with each other by an appropriate pressing force, the contact portion of the membrane switch is configured in such a manner that a hole of a predetermined size is drilled in the spacer, and the upper and lower electrodes come into contact with each other through this hole. Moreover, as a similar configuration to the membrane switch, a pressure sensitive sensor using pressure sensitive ink has been known. In this pressure sensitive sensor, at least one of the opposite electrodes has been a pressure sensitive electrode made of the pressure sensitive ink so that a resistance value can be changed according to a pressure applied thereto.

The electrode sheets and the spacer are adhered by the adhesive. As such a spacer, it is general to use a spacer with adhesive (double coated adhesive sheet with base material), in which the adhesive is applied on both surfaces of the spacer beforehand. Moreover, in some cases, a spacer having an adhesive paste printed thereon by use of a printing technology is used. In the case of using the spacer with adhesive, a level spacer sheet is subjected to drilling processing by use of a die or the like. Accordingly, the adhesive is provided to a peripheral portion of the hole formed in the spacer. Various types of spacers and adhesives are used in accordance with a purpose of a product and an affinity of the material therewith. As general spacers, PET, PEN, PEI, PI and the like are used. Moreover, as representative adhesives, ones of an acrylic series, a urethane series, a silicone series and the like are given.

In the case of the membrane switch and the pressure sensitive sensor as described above, an interval between the upper and lower electrodes, a hole diameter of the spacer, a rigidity of the upper and lower electrode sheets, a viscoelastic property of the adhesive and the like mainly become parameters for deciding a load necessary to bring the upper and lower electrode sheets into contact with each other. Accordingly, in order to conduct electricity through the point of contact by means of a desired pressure or force, it is necessary to set these parameters at appropriate values.

Moreover, it is also important for sensitivities of the membrane switch and the pressure sensitive sensor not to vary very much depending on a temperature environment. Temperature dependency of the sensitivities of the membrane switch and the pressure sensitive sensor is determined by a temperature property of the above-described parameters. Among these, since the interval between the upper and lower electrodes and the hole diameter of the spacer hardly vary, they have little relationship with the sensitivities. However, the rigidity of the electrode sheets and the viscoelasticity of the adhesive have temperature dependency and affect the sensitivities largely.

When the upper and lower electrodes are warped, an adhesive layer is deformed accompanying this. The rigidity of the electrode sheets is derived from temperature dependency of an elastic modulus proper to the electrode sheet material, and is determined by a selected material and processing conditions thereof. A material having smaller temperature dependency of the elastic modulus will have smaller temperature dependency of the rigidity. The temperature dependency of the adhesive is also similar to the above, that is, this temperature dependency is a physical property proper to the material, and an adhesive having small temperature dependency is required.

Accordingly, in order to improve the temperature property in terms of the structure while leaving the structure as it is, there is no other way but to select a material. However, when a material having small temperature dependency is selected, cost is increased, and therefore, there has been no effective means for improving the temperature property in terms of the structure at low cost.

SUMMARY OF THE INVENTION

This invention was made in order to solve the subjects as described above. The object of the present invention is to provide a membrane switch and a pressure sensitive sensor, which are capable of improving the temperature property in terms of the structure at low cost.

A membrane switch according to the present invention includes: a pair of electrode sheets having electrodes formed respectively on opposite surfaces of a pair of sheetlike base materials disposed oppositely, the electrodes constituting a contact portion; a spacer interposed between the pair of electrode sheets so that the electrode sheets are opposed to each other with a predetermined interval spaced therebetween, the spacer having a hole formed in a position of the contact portion; and an adhesive for bonding the spacer between the pair of electrode sheets, wherein the adhesive on at least one surface side of a peripheral portion of the hole of the spacer is removed.

A pressure sensitive sensor according to the present invention includes: a pair of electrode sheets having electrodes formed respectively on opposite surfaces of a pair of sheetlike base materials disposed oppositely, the electrodes constituting a contact portion, and at least one of the electrodes being a pressure sensitive electrode; a spacer interposed between the pair of electrode sheets so that the electrode sheets are opposed to each other with a predetermined interval spaced therebetween, the spacer having a hole formed in a position of the contact portion; and an adhesive for bonding the spacer between the pair of electrode sheets, wherein the adhesive on at least one surface side of a peripheral portion of the hole of the spacer is removed.

According to the present invention, there are removed the adhesives on both surfaces (used to deform the electrode sheets on the both surfaces) of the peripheral portion of the spacer hole for bringing the upper and lower electrodes into contact with each other or on one surface thereof (used to deform the electrode sheet on the one surface). Therefore, when the adhesive is deformed accompanying the deformation of the electrode sheet, even if an deformation amount is changed due to temperature change (for example, even if the adhesive is hard to be deformed at low temperature and apt to be deformed at high temperature), the deformation of the electrode sheet becomes a deformation with a contact point or contact line of the electrode sheet and the spacer as a fulcrum from a point of time when the electrode sheet and the spacer contact with each other. Therefore, the deformation comes hardly to be affected by the viscoelastic property of the adhesive. Thus, it is made possible to improve the temperature property in terms of the structure, which is derived from the viscoelasticity of the adhesive.

With regard to a method for removing or retreating the adhesive from the peripheral portion of the spacer hole, various methods are conceivable. For example, in the case of forming the adhesive by printing, a region on a printing pattern, where the adhesive (adhesive paste or the like) is not printed, is made larger than a diameter of the spacer hole. In the case of using a transcription type adhesive, it is recommended to drill a hole larger than the spacer beforehand by drilling processing for a transcription sheet.

Moreover, if a convex portion is previously formed of a material having small temperature dependency of the viscoelasticity than the adhesive, and preferably, of a material having temperature dependency of the elastic modulus as small as or smaller than that of the electrode sheet on the opposite surface of the electrode sheet opposite to the peripheral portion of the spacer hole, from which the adhesive is removed, then the convex portion and the spacer contact with each other at an earlier stage after the electrode sheet starts to be warped. Consequently, it is made possible to eliminate the influence of the elastic modulus of the adhesive earlier than the case of not providing the convex portion and to improve the temperature dependency further.

It is desirable that the convex portion be formed of the same material in the same process as those of the electrode. Particularly, in the case where the electrode or the pressure sensitive electrode is formed of conductive paste or pressure sensitive ink by a method such as screen printing, if the convex portion is formed of the same material as that of the electrode, then the convex portion can be also formed in the process of forming the electrode by printing. Therefore, the reduction in manufacturing cost can be achieved. In the case where the convex portion is formed of the same material in the same process as those of the electrode, as compared with the case where the convex portion is formed of another material, effects can be expected, in which the interval between the upper and lower electrodes is held constant, and sensitivity change with respect to pressure necessary to contact the upper and lower electrodes each other can be reduced. This is because, in the case of forming the convex portion and the electrode of the same material, at the point of time when the upper and lower electrode sheets start to be warped and the convex portion and the spacer contact with each other, the interval between the electrodes always becomes equal to a thickness of the spacer. Thus, in the case of multi-contact switching unit and pressure sensitive sensor, variations in sensitivity in terms of the structure can be suppressed to be smaller.

BRIEF DESCRIPTION OF THE DRAWINGS

FIG. 1A is a cross-sectional view along a direction IA—IA of FIG. 2, FIG. 1B is a view of a spacer of the pressure sensitive sensor viewed from the above, and FIG. 1C is a cross-sectional view along a direction IC—IC of FIG. 2.

FIG. 3A is a cross-sectional view along a direction IIIA—IIIA of FIG. 4, FIG. 3B is a view of a spacer of the pressure sensitive sensor viewed from the above, and FIG. 3C is a cross-sectional view along a direction IIIC—IIIC of FIG. 4.

FIG. 5 is an experimental result of a comparative experiment in an example 1 and a comparative example 1.

FIG. 6 is an experimental result of a comparative experiment in an example 2 and the comparative example 2.

DESCRIPTION OF THE PREFERRED EMBODIMENT

Hereinafter, description will be made for one preferred embodiment of the present invention with reference to the drawings.

Figure 1A:
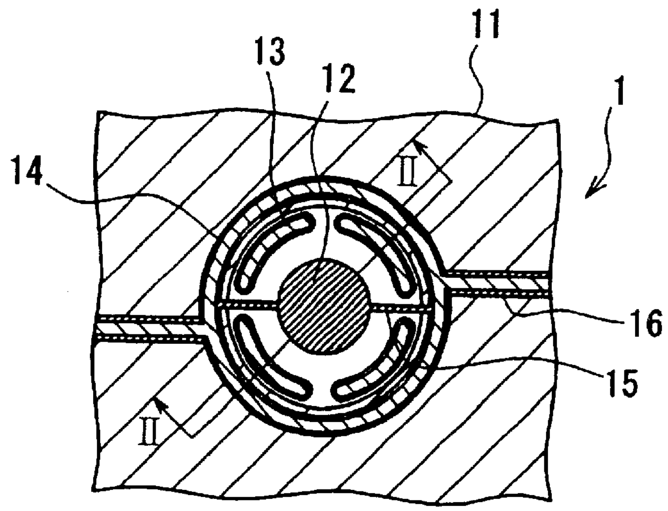
FIGS. 1A to 1C show a pressure sensitive sensor according to one embodiment of the present invention.
Figure 1B:
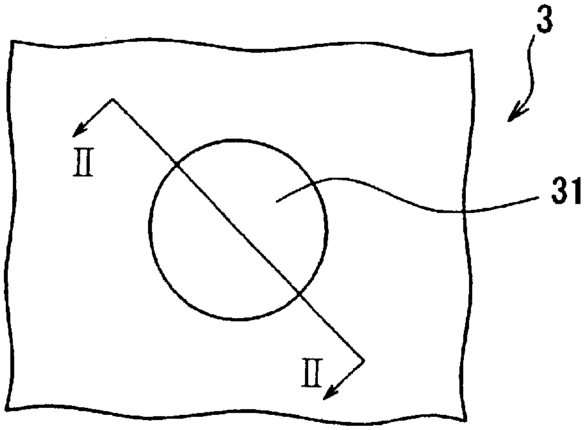
Figure 1C:
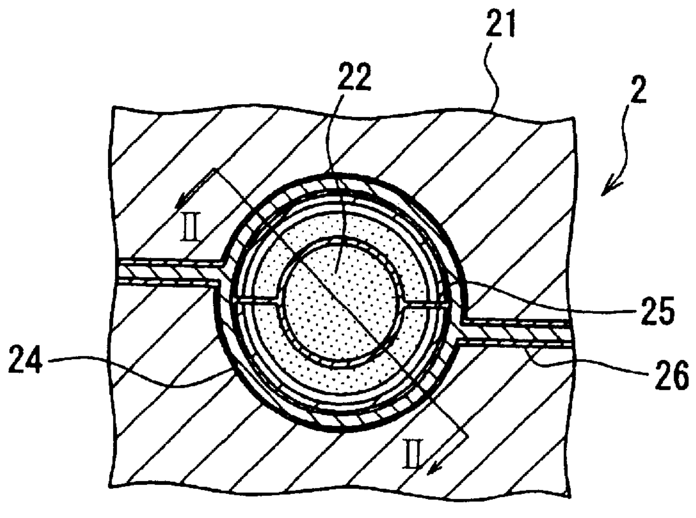
Figure 2:
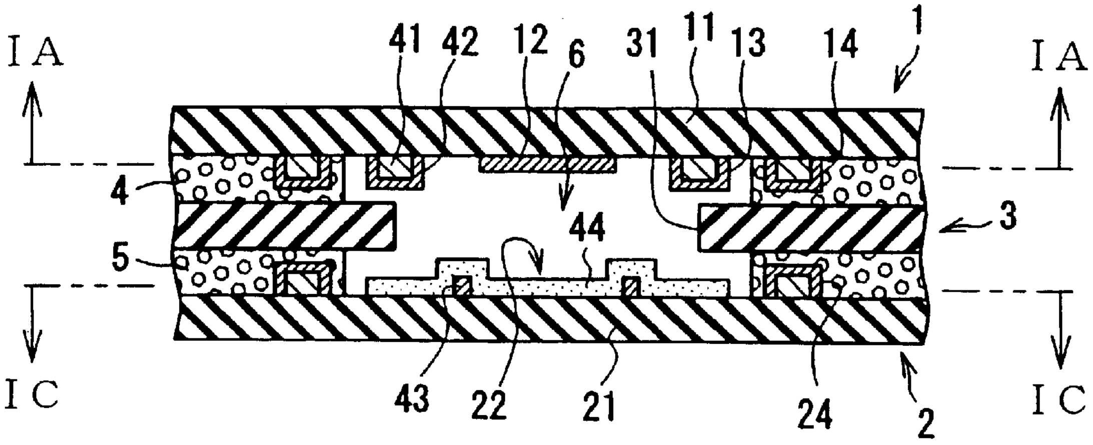
FIG. 2 is a cross-sectional view in a case of cutting the pressure sensitive sensor according to the one embodiment of the present invention along a direction II—II of FIG. 1A.

FIGS. 1A to 1C show a pressure sensitive sensor according to the one embodiment of the present invention. FIG. 1A is a cross-sectional view along a direction IA—IA of FIG. 2, FIG. 1B is a view of a spacer of the pressure sensitive sensor viewed from the above, and FIG. 1C is a cross-sectional view along a direction IC—IC of FIG. 2. FIG. 2 is a cross-sectional view in a case of cutting the pressure sensitive sensor according to the one embodiment of the present invention along a direction II—II of FIG. 1A.

The pressure sensitive sensor according to this embodiment includes upper and lower electrode sheets 1 and 2 disposed oppositely, and a spacer 3 interposed between both of the sheets 1 and 2 for forming a desired interval therebetween, wherein these electrode sheets 1 and 2 and spacer 3 are bonded with adhesives 4 and 5 interposed therebetween. The upper electrode sheet 1 is composed by forming a printed circuit to be described below on a surface (lower surface) of a flexible sheetlike base material 11, which is opposite to the lower electrode sheet 2. Namely, on the lower surface of the sheetlike base material 11, a circular electrode 12 is formed. Circular arched convex portions 13 are formed on four spots in a circumferential direction so as to surround this electrode 12. Further, a ringlike conductive pattern 14 is formed so as to surround these convex portions 13. The electrode 12 and the conductive pattern 14 are connected to each other by a lead 15. The conductive pattern 14 is connected to another unillustrated circuit through a lead 16. Meanwhile, the lower electrode sheet 2 is composed by forming a printed circuit to be described below on a surface (upper surface) of a flexible sheetlike base material 21, which is opposite to the upper electrode sheet 1. Namely, on the upper surface of the sheetlike base material 21, a circular pressure sensitive electrode 22 is formed. A ringlike conductive pattern 24 is formed so as to surround this pressure sensitive electrode 22. The pressure sensitive electrode 22 and the conductive pattern 24 are connected to each other by a lead 25. The conductive pattern 24 is connected to another unillustrated circuit through a lead 26.

A contact portion 6 is constituted of the electrode 12 and the pressure sensitive electrode 22. In the spacer 3, a hole 31 is formed in a position of this contact portion 6. As shown also in FIG. 2, a diameter of this hole 31, the convex portions 13 and the pressure sensitive electrode 22 are set in such a positional relationship that a peripheral portion of the hole 31 is overlapped between the convex portions 13 and the pressure sensitive electrode 22. Then, the adhesives 4 and 5 open more largely than the diameter of the hole 31 of the spacer 3 so as to be removed from the peripheral portion of the hole 31 on both surfaces of the spacer 3. Hatched portions of FIGS. 1A and 1C indicate a planar position into which the adhesives 4 and 5 are interposed.

As the sheetlike base materials 11 and 21 and the spacer 3, for example, PET, PEN, PEI, PI or the like can be used. As the adhesives 4 and 5, an adhesive, an adhesive paste and the like, which are made of acrylics, urethanes, silicones or the like, can be used. The electrode 12 and the leads 15, 16, 25 and 26 can be formed by printing, for example, by means of carbon and the like. The convex portions 13 can be constituted, for example, by coating carbon 42 on a silver paste 41 in order to secure an protrusion quantity thereof, and can be formed by screen printing or the like. The pressure sensitive electrode 22 is composed, for example, by forming pressure sensitive ink 44 in a predetermined thickness and in a circular shape on a ringlike Ag electrode 43. Moreover, it is desirable that a space between the pressure sensitive electrode 22 and the conductive pattern 24, where the Ag electrode 43 is exposed, be covered with carbon and the like, for example. As the pressure sensitive ink 44, plastics and the like containing conductive fine particles of carbon and the like can be used, for example.

In the pressure sensitive sensor thus constituted, the adhesives 4 and 5 of the peripheral portion of the hole 31 on the both surfaces of the spacer 3 for contacting the upper and lower electrodes 12 and 22 are removed. In a portion opposite to the peripheral portion, the convex portions 13 and the pressure sensitive electrode 22 are formed. Therefore, when the electrode sheets 1 and 2 are deformed, the convex portions 13 and the pressure sensitive electrode 22 abut on the peripheral portion of the hole 31 of the spacer 3, and the electrode sheets 1 and 2 are deformed with this abutting point as a fulcrum. Accordingly, the deformation comes hardly to be affected by the viscoelastic property of the adhesives 4 and 5. Thus, it is made possible to improve the temperature property in terms of the structure owing to the viscoelasticity of the adhesives 4 and 5.

Hereinafter, description will be made for concrete examples and comparative examples.

EXAMPLE 1

A switch unit was fabricated, which was formed of a membrane switch composed of a similar electrode to the electrode 12 of the upper electrode sheet 1 instead of the pressure sensitive electrode 22 of the lower electrode sheet 2 shown in FIGS. 1A to 2. Materials and thicknesses of principal members thereof are listed as below.

Upper and lower electrode sheets 1 and 2
Material: PEN
Thickness: 100 μm
Spacer 3
Material: PET
Thickness: 75 μm
Hole diameter: ϕ12 mm
Adhesives 4 and 5
Material: acrylic
Thickness: 25 μm
Hole diameter: ϕ15 mm
Upper and lower electrode materials
Base material-side material: silver
Surface-side material: carbon
Convex portions 13: provided
Material: same material as that of the upper and lower electrode materials The above membrane switches were formed for 20 points of contact to fabricate the switch unit.

Comparative Example 1

A switch unit having membrane switches for 20 points of contact was fabricated, in which materials and thicknesses of the respective members are similar to those of the example 1, no convex portions 13 are provided in the electrode sheet 1, and hole diameters of the adhesives 4 and 5 are ϕ12 mm, which is the same as the diameter of the hole 31 of the spacer 3.

For these example 1 and comparative example 1, variations in sensitivity of the 20 points of contact under normal temperature and a variation rate of an ON load of the switch in a temperature range of −30 to 80° C. were measured. Results thereof are shown in FIG. 5.

EXAMPLE 2

A similar pressure sensitive sensor to the one shown in FIGS. 1A to 2 was fabricated. Materials and thicknesses of principal members thereof are listed as below.

Upper and lower electrode sheets 1 and 2
Material: PEN
Thickness: 100 μm
Spacer 3
Material: PET
Thickness: 75 μm
Hole diameter: ϕ12 mm
Adhesives 4 and 5
Material: acrylic
Thickness: 25 μm
Hole diameter: ϕ15 mm
Upper electrode material
Base material-side material: silver
Surface-side material: carbon
Lower electrode material
Pressure sensitive ink electrode
Convex portions 13: provided
Material: same material as that of the upper and lower electrode materials The above pressure sensitive sensors were fabricated for 20 points of contact.

Comparative Example 2

Figure 3A:
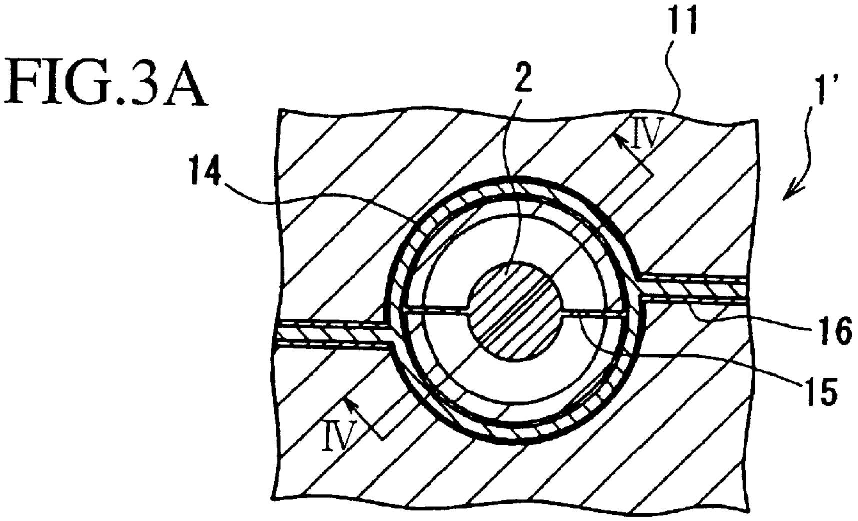
FIGS. 3A to 3C show a pressure sensitive sensor according to a comparative example 2.
Figure 3B:
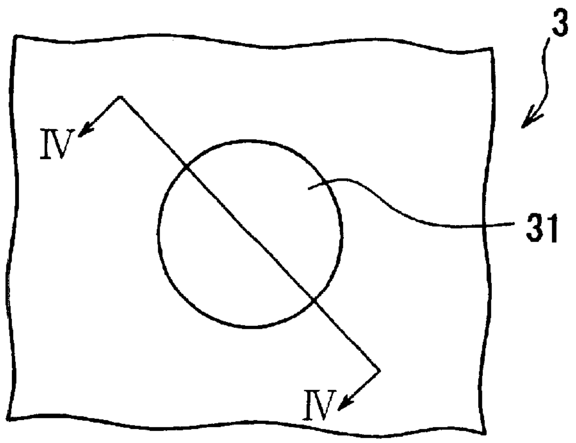
Figure 3C:
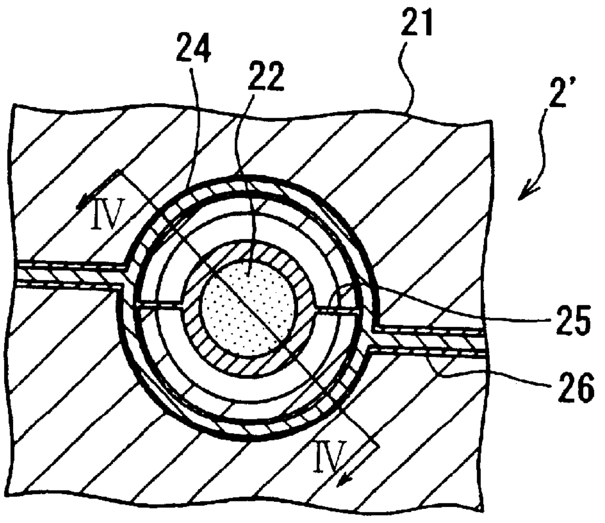
Figure 4:
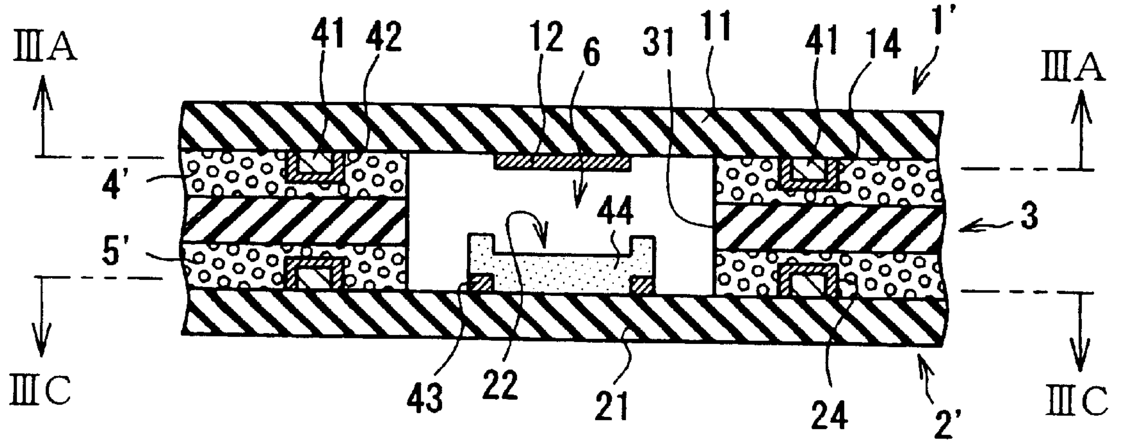
FIG. 4 is a cross-sectional view in a case of cutting the pressure sensitive sensor according to the comparative example 2 along a direction IV—IV of FIG. 3A.

FIGS. 3A to 3C show a pressure sensitive sensor according to a comparative example 2. FIG. 3A is a cross-sectional view along a direction IIIA—IIIA of FIG. 4, FIG. 3B is a view of a spacer of the pressure sensitive sensor of the comparative example 2, viewed from the above, and FIG. 3C is a cross-sectional view along a direction IIIC—IIIC of FIG. 4. Moreover, the same portions as those in FIGS. 1A to 2 are denoted by the same reference numerals.

The materials and thicknesses of the respective members are similar to those of the example 2, no convex portions 13 are provided in an electrode sheet 1', and hole diameters of adhesives 4' and 5' are set at ϕ12 mm, which is the same as the diameter of the hole 31 of the spacer 3. Such pressure sensitive sensors were fabricated for 20 points of contact.

For these example 2 and comparative example 2, variations in sensitivity of the 20 points of contact under normal temperature and a variation rate of a circuit resistance when the contact portion 6 is pressurized at 20 kPa in the temperature range of −30 to 80° C. were measured. Results thereof are shown in FIG. 6.

As apparent from the results of FIG. 5 and FIG. 6, with regard to the variations in sensitivity of the 20 points of contact under normal temperature, while the comparative examples 1 and 2 presented ±30% in the variations, the examples 1 and 2 were able to suppress the variations to ±15%. Moreover, with regard to the variation rates due to temperature, while the comparative examples 1 and 2 presented +90% to −50%, the examples 1 and 2 presented a great improvement to +15% to −20%.

Particularly, in the case of the pressure sensitive sensor, as compared with the switch unit, the temperature property thereof is good in both of the example and the comparative example. This results from the temperature dependency of a coating resistance of the used pressure sensitive ink. In the case of the pressure sensitive ink, a characteristic that a larger contact area of the upper and lower electrodes brings a lower resistance value is inherent therein. Accordingly, due to a negative temperature property (property that the rigidity is decreased and the sensitivity is increased as the temperature is elevated) possessed by the structure of the pressure sensitive sensor, in the case of pushing down the sensor by the same pressure, the contact area of the upper and lower electrodes is increased. However, in the case where the temperature property of the pressure sensitive ink coating has a positive temperature property (property that the resistance value is elevated as the temperature is elevated), the increased amount of the contact area is mutually cancelled by the elevation of the resistance of the pressure sensitive ink coating. Consequently, the sensitivity change as a whole of the sensor can be reduced. Namely, the use of pressure sensitive ink having a positive temperature property in accordance with the negative temperature property of the sensor structure almost eliminates the temperature dependency of the sensor sensitivity. Alternatively, the selection of the sensor structure in accordance with the pressure sensitive ink can also obtain a similar effect.

Note that, in the above embodiment, the adhesives 4 and 5 of the peripheral portion of the hole 31 are removed from the both surfaces of the spacer 3. However, if only the adhesive on the electrode sheet side, to which a load is applied, is at least removed, then the effect of the present invention can be exerted. For a similar reason, it is sufficient if the convex portion 13 may also be formed only on any one of the surfaces. Even if the convex portions are not formed at all, the electrode sheet and the spacer come into direct contact with each other to form a fulcrum portion. Therefore, the effect of the present invention can be obtained.

What is claimed is:

1. A membrane switch, comprising:

a pair of electrode sheets having electrodes formed respectively on opposite surfaces of a pair of sheetlike base materials disposed oppositely, the electrodes constituting a contact portion;

a spacer interposed between the pair of electrode sheets so that the electrode sheets are opposed to each other with a predetermined interval spaced therebetween, the spacer having a hole formed in a position of the contact portion; and an adhesive for bonding the spacer between the pair of electrode sheets, wherein the adhesive on at least one surface side of a peripheral portion of the hole of the spacer is removed.

2. The membrane switch according to claim 1, further comprising:

a convex portion formed on an opposite surface of the electrode sheet opposite to the peripheral portion of the hole of the spacer, from which the adhesive is removed, the convex portion having smaller temperature dependency of viscoelasticity than the adhesive.

3. The membrane switch according to claim 2, wherein the convex portion is formed of a same material and in a same process as those of the electrodes.

4. A pressure sensitive sensor, comprising:

a pair of electrode sheets having electrodes formed respectively on opposite surfaces of a pair of sheetlike base materials disposed oppositely, the electrodes constituting a contact portion, and at least one of the electrodes being a pressure sensitive electrode;

a spacer interposed between the pair of electrode sheets so that the electrode sheets are opposed to each other with a predetermined interval spaced therebetween, the spacer having a hole formed in a position of the contact portion; and an adhesive for bonding the spacer between the pair of electrode sheets, wherein the adhesive on at least one surface side of a peripheral portion of the hole of the spacer is removed.

5. The pressure sensitive sensor according to claim 4, further comprising:

a convex portion formed on an opposite surface of the electrode sheet opposite to the peripheral portion of the hole of the spacer, from which the adhesive is removed, the convex portion having smaller temperature dependency of viscoelasticity than the adhesive.

6. The membrane switch according to claim 5, wherein the convex portion is formed of a same material and in a same process as those of the electrodes.

7. The pressure sensitive sensor according to claim 4, wherein the pressure sensitive electrode has a positive temperature property that a resistance value is increased as a temperature is elevated.

* * * * *